United States Patent [19]

Nishio et al.

[11] 4,237,543
[45] Dec. 2, 1980

[54] MICROPROCESSOR CONTROLLED DISPLAY SYSTEM

[75] Inventors: Yoji Nishio; Toshitaka Hara; Nagaharu Hamada, all of Hitachi, Japan

[73] Assignee: Hitachi, Ltd., Japan

[21] Appl. No.: 938,954

[22] Filed: Sep. 1, 1978

[30] Foreign Application Priority Data

Sep. 2, 1977 [JP] Japan .................. 52-104882

[51] Int. Cl.[3] .............................................. G06F 3/14
[52] U.S. Cl. .................... 364/900; 340/750; 340/799
[58] Field of Search ............... 364/200, 900; 340/799, 340/750, 154

[56] References Cited

U.S. PATENT DOCUMENTS

| 4,011,556 | 3/1977 | Tochitani et al. | 340/799 |
|---|---|---|---|
| 4,070,710 | 1/1978 | Sukonick et al. | 364/900 |
| 4,075,620 | 2/1978 | Passavant et al. | 340/799 |
| 4,092,728 | 5/1978 | Baltzer | 364/900 |
| 4,103,331 | 7/1978 | Thacker | 340/750 |
| 4,104,624 | 8/1978 | Hamada | 340/799 |
| 4,129,858 | 12/1978 | Hara | 340/154 |
| 4,129,859 | 12/1978 | Iwamura et al. | 340/750 |

Primary Examiner—Charles E. Atkinson
Assistant Examiner—Gary Chin
Attorney, Agent, or Firm—Craig & Antonelli

[57] ABSTRACT

A display system for displaying information in response to an input video signal comprises a data control unit including a microprocessor and a microprogram memory for storing a program for the microprocessor, a refresh memory unit connected to the data control unit through an address bus and a data bus, and a video control unit for accessing display data stored in the refresh memory unit by a timing control unit to produce a video signal. The refresh memory unit comprises memories sectioned by byte, an I/O controller which receives a read/write control signal to indicate whether the access by the data control unit is read access or write access and an access memory specifying signal to indicate whether it is a one-byte memory access or a two-byte memory access to produce an I/O control signal, and a memory controller responsive to the I/O control signal to control data access to the two byte memories.

8 Claims, 4 Drawing Figures

MICROPROCESSOR CONTROLLED DISPLAY SYSTEM

BACKGROUND OF THE INVENTION

1. Field of the Invention

The present invention relates to a display system suitable for use with a digital computer, and more particularly to a display system with a data structure which is suited to be microprogram-controlled.

2. Description of the Prior Art

A display system suitable for use with an electronic computer generally comprises a data control unit for controlling the exchange of data with an external information source such as an electronic computer or a keyboard, a refresh memory for storing a field of display data with the aid of the data control unit and reading out the data in synchronism with a display timing, a video control unit for converting the display data read out of the refresh memory to a display video signal, a viewer which receives the video signal from an output of the video control unit and displays it on a screen of a cathode ray tube (CRT) as a visible image, and a timing control unit for producing a control timing signal for the data control unit, an I/O timing signal for the refresh memory, a signal output timing signal for the video control unit and a display timing signal for the viewer.

In this type of the display system, as the field of application thereof was broadened, the content of processing has become versatile and the display function has also become versatile. Thus, in order to meet the processing and display functions by a pure hardware configuration, there necessarily results a large scale configuration. As an approach thereto, it has been proposed to incorporate a microcomputer in the data control unit of the display system to increase the flexibility of the content of processing by the microprogram control by the microcomputer or reduce the amount of hardware.

An example of the display system incorporating the microcomputer is shown in Japanese Patent Appln. Kokai (Laid-Open) No. 82134/77 which was filed Dec. 29, 1975, assigned to the assignee of the present invention and was laid open July 9, 1977. It corresponds to U.S. Application Ser. No. 754,997 now Pat. No. 4,104,624 filed Dec. 28, 1976. The display system disclosed in the U.S. application Ser. No. 754,997 now U.S. Pat. No. 4,104,624 comprises a data control unit, a refresh memory unit and a timing control unit which are interconnected via a common address bus and a common data bus, and the data control unit includes a microprocessor and a microprogram memory. While the refresh memory unit stores display data from an external information source, the data transfer to and from the external information source is carried out under the microprogram control by the microprocessor and the microprogram memory in the data control unit. The microprocessor is, in general, a byte machine which handles the information by one byte or eight bits. On the other hand, the display data is generally at least 16-bit information or 2-byte information as the number of display information increases and the number of display modes of the display information (e.g. designation of color, size or brightness and presence or absence of blinking) increases. Since the data control unit and the refresh memory are interconnected via the common address bus and data bus, the refresh memory can only receive the data one byte at a time. On the other hand, the display data is of one-word (two-byte) configuration as described above and hence it is desirable to read the display information from the refresh memory by two bytes (equal to 16 bits) at a time in order to simplify the construction. (The readout timing is in synchronism with the display timing.) Accordingly, in the U.S. application Ser. No. 754,997 now U.S. Pat. No. 4,104,624, the refresh memory unit is divided into an upper byte memory and a lower byte memory, and for each access by the data control unit (data read or data write), the upper or lower byte memory is specified for each byte and one-byte information of the two-byte data is written into a specified address of that memory. Thereafter, the other one-byte information is written into a specified address of the other memory. Similarly, when data is to be read from the refresh memory unit into the data control unit, the content at a specified address of the upper or lower byte memory is read one byte at a time. When it is necessary to read out two-byte display information, both the upper and lower byte memories are addressed simultaneously and the two-byte display data is temporarily stored in a display register, which is then read out by the video control unit. In this manner, in the display system disclosed in the U.S. application Ser. No. 754,997 now U.S. Pat. No. 4,104,624, the data of the refresh memory unit is read or written by one byte at a time for the access by the data control unit while it is read by two bytes (one word) at a time for the readout for display. Therefore, the overall construction of the display system is simplified. Furthermore, since any desired processing can be performed by modifying the microprogram, the system can be used for general purposes.

However, since the I/O processing (access) from the data control unit can only be carried out one byte at a time as described above, a problem occurs in that much time is required to edit the content displayed in the viewer. When image editing is to be carried out, it is necessary to rewrite the one-byte information stored in the lower byte memory and the other one-byte information stored in the upper byte memory, for each display data. Thus, the data control unit must alternately access, by one byte at a time, all of the necessary display data (multiple of one word). As is described in detail in the U.S. application Ser. No. 754,997, now U.S. Pat. No. 4,104,624 when the readout operation for display and the I/O operation due to the access by the data control unit are alternately carried out in a time division manner, it is necessary to store an information indicative of the current address at which the I/O operation is carried out in preparation for the next I/O operation when the operation moves from the I/O operation to the read operation for display. For this reason, the prior art display system involves a problem that a procedure for editing the information displayed on the screen is complex and high speed editing cannot be attained.

SUMMARY OF THE INVENTION

It is an object of the present invention to provide a display system which enables high speed editing of information displayed on a screen.

It is another object of the present invention to provide a display system which can achieve the above object by a relatively simple construction.

One feature of the present invention resides in that there is provided an editing register having a one-byte capacity for at least one of two byte memory blocks in the refresh memory unit, and when the two byte memory blocks are addressed by the data control unit, that memory block which is provided with the editing register exchanges the data with the editing register while the other memory block directly exchanges the data with the data control unit through the data bus.

Another feature of the present invention resides in that there are provided an I/O controller which receives a signal indicating whether or not the data control unit addressed a plurality of bytes in the refresh memory and a signal indicating whether the access by the data control unit is for read or for write to produce an I/O control signal for controlling data input/output between the data control unit and the refresh memory, an editing register of one-byte capacity for one of a plurality of byte memories, and multiplexors coupled to an input and an output of the editing register to select a destination address of the data in response to the I/O control signals, whereby when the plurality of memory blocks are accessed in parallel, that memory block which is provided with the editing register exchanges the data with the editing register while the other memory blocks directly exchange the data with the data control unit through the data bus.

Those and other objects, features and advantages of the present invention will be more apparent from the following description of the preferred embodiments of the invention.

DETAILED DESCRIPTION OF THE PREFERRED EMBODIMENTS

Figure 1:
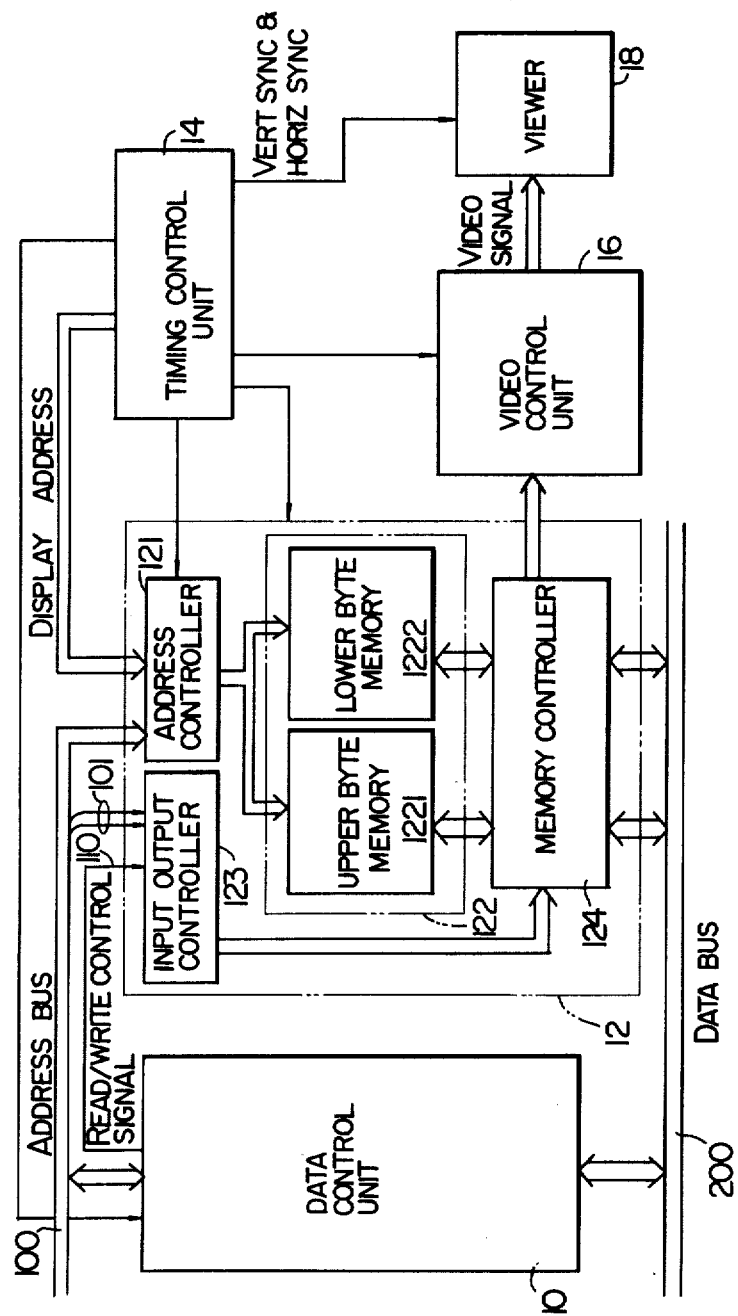
FIG. 1 shows an overall configuration of a preferred embodiment of the present invention.

FIG. 1 shows an embodiment of the present invention. In FIG. 1, numeral 10 denotes a data control unit which is connected to an external information source (e.g. computer or keyboard) not shown, and writes display information into a refresh memory unit, or reads information stored in the refresh memory into the external information source, or changes the arrangement of memory content in the refresh memory under the control of command from the external information source. As is disclosed in the U.S. application Ser. No. 754,997 now U.S. Pat. No. 4,104,624, the data control unit 10 comprises a microprocessor, a microprogram memory for storing a program (microprogram) for the microprocessor, an I/O port for controlling data transfer to and from the external information source and an address driver for supplying to an address bus an address signal for specifying destination address or source address of the data. Numeral 12 denotes the refresh memory unit which comprises an address controller 121, a memory unit 122 for storing a field of display data, an I/O controller 123 responsive to a command from the data control unit 10 to produce a control signal indicative of whether the access is for one byte or two bytes, and a memory controller 124 having a function of reading from or writing into the memory unit 122 by one byte at a time or two bytes at a time depending on the content of the control signal from the controller 123. The refresh memory unit 12 is accessed not only from the data control unit 10 but also from a timing control unit 14. The access from the timing control unit 14 is the readout of data for display. The readout from the timing control unit 14 is carried out by imposing a display address to the address controller 121 so that the content at the specified address of the memory unit 122 is temporarily read into the memory controller 124 where it is timed and supplying the content of the memory controller 124 to a video control unit 16. The timing control unit 14 produces a timing signal for the entire display system and the display address for specifying the memory readout address for display. The video control unit 16 receives the display data readout for display and produces a video signal in accordance with the display data. Numeral 18 denotes a viewer which receives the video signal from the video control unit 16 and also receives a horizontal synchronizing signal and a vertical synchronizing signal from the timing control unit 14 to display the information on a screen.

Referring to FIG. 1, the data access between the data control unit 10 and the refresh memory unit 12 will now be explained. Assume that the data control unit 10 reads the contents at an address of the refresh memory unit 12. The unit 10 supplies a desired address of the memory unit 122 to the address bus 100. At the same time, it supplies an access memory specifying signal to the most significant two bits of the address bus to indicate which memory (upper byte memory or lower byte memory) of the memory unit 122 is to be accessed or that both memories of the memory unit are to be accessed. At the same time, it further supplies a one-bit read/write control signal to indicate whether the access is for data read or data write. In the present example, assume that the read/write control signal is "1" for read and "0" for write. Since the data read is being considered, the read/write control signal is "1". The access memory specifying signal 101 (the most significant two bit signals on the address bus) and the read/write control signal 110 are received by the I/O controller 123. Of the signals carried by the address bus, the signals other than the most significant two bit signals (an address signal of a memory to be readout) are received by the address controller 121, which specifies an address in the memory unit 122 in accordance with the address signal received. On the other hand, the I/O controller 123 produces an I/O control signal in accordance with the read/write control signal and the access memory specifying signal to the memory controller 124 which in turn reads out the content at the address of the memory unit 122 which the address controller 121 specifies by the I/O control signal and supplies the content to the data control unit 10 through the data bus 200. While the readout of the data stored in the refresh memory unit 12 has been described, the write of the data from the data control unit 10 into the refresh memory unit can be carried out in a similar procedure. For the write operation, the read/write control signal is "0".

Figure 2:
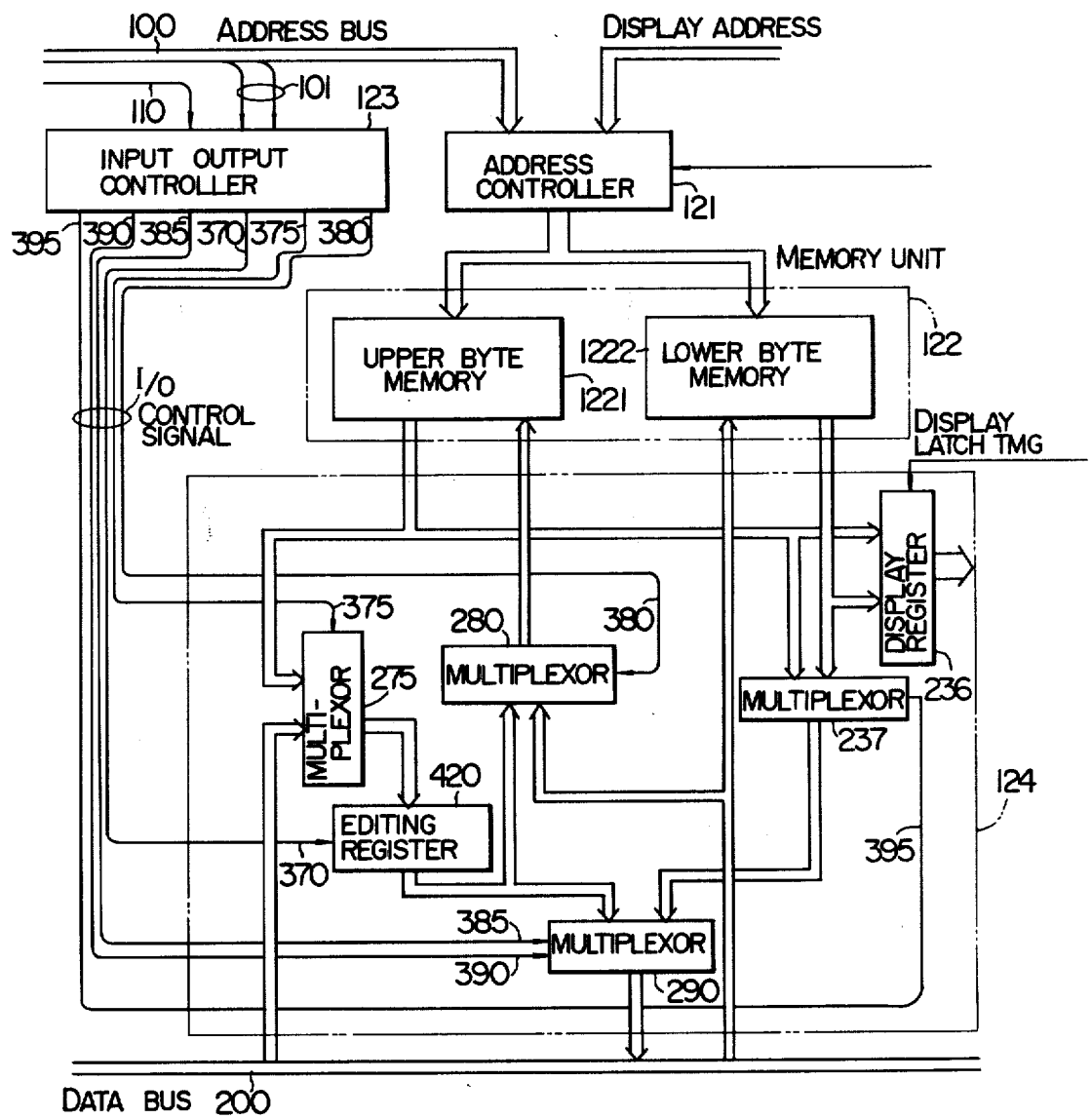
FIG. 2 shows, in further detail, a refresh memory unit shown in FIG. 1, which is a characteristic unit of the present invention.

The operation of the circuit of FIG. 1 will now be explained in detail with reference to FIG. 2, which shows the refresh memory 12 of FIG. 1 in further detail. In FIG. 2, numerals like to those in FIG. 1 designate units of like function. The memory controller 124 comprises an I/O register 420 of one-byte capacity and multiplexors 275, 280, 290 and 237 which are controlled by the I/O control signal (which is the output signal from the I/O controller 123), and a display register 236 for storing the display data. The multiplexors 275, 280, 237 and 290 are switching gates for selecting one of two input data, respectively, and they may be SN74157 and SN74S257 manufactured by Texas Instruments Inc. All of the multiplexors and the I/O register other than the display register 236 for storing the data read for display are controlled by the output of the I/O controller 123. The controller 123 receives the read/write control signal 110 and the access memory specifying signal 101 from the data control unit 10 and produces the following six I/O control signals:

370 . . . a latch signal for latching the output of the multiplexor 275 to the editing register 420.

375 . . . a switching signal for supplying to the editing register 420 one of two data (data of the upper byte memory 1221 and data on the data bus 200) applied to the multiplexor 275.

380 . . . a switching signal for supplying to the upper byte memory 1221 one of two data (data of the editing register 420 and data on the data bus 200) applied to the multiplexor 280.

385 . . . an output control signal for the multiplexor 290.

390 . . . a switching signal for supplying to the data bus one of two data (data of the edition register 420 and data from the multiplexor 237) applied to the multiplexor 290.

395 . . . a switching signal for supplying to the multiplexor 290 one of two data (data of the upper byte memory 1221 and data of the lower byte memory 1222) applied to the multiplexor 237.

The controller 123 for producing those signals may be constructed of a read only memory (ROM) which produces output values to meet the following truth table. The triggering of the latch timing signal 370 is obtained by latching a high level output of the ROM.

In FIG. 2, when the data control unit 10 specifies an address in the lower byte memory 1222 to read data stored at that address, the data passes through the multiplexor 237 by the switching signal 395 and also passes through the multiplexor 290 by the signals 385 and 390 and it is read into the data bus 200. When the unit 10 specifies an address in the lower byte memory 1222 to write data therein, the data is directly written from the data bus into the specified address of the memory 1222.

When the unit 10 specifies an address in the upper byte memory 1221 to read data stored therein, the data passes through the multiplexor 237 by the switching signal 395 and it is read into the data bus 200 through the multiplexor 290 which is controlled by the signals 385 and 390. When the data is written into the memory 1221, the data passes from the data bus 200 through the multiplexor 280 by the switching signal 380 andit is written into the memory 1221.

When the data control unit 10 simultaneously addresses both upper and lower byte memories in parallel to read the data stored therein, the data in the lower byte memory 1222 passes through the multiplexor 237 by the switching signal 395 and it is read out to the data bus 200 through the multiplexor 290 which is controlled by the signals 385 and 390. On the other hand, the data stored at the specified address of the upper byte memory 1221 which is simultaneously addressed passes through the multiplexor 275 by the switching singal 375 and it is read into the editing register 420 by the latch signal 370.

When the data control unit 10 simultaneously addresses both upper and lower byte memories to write data therein, the data to be stored in the lower byte memory 1222 is directly written into the memory 1222 from the data bus 200. The content of the editing register 420 is written into the upper byte memory 1221 through the multiplexor 280 which is controlled by the switching signal 380.

TABLE 1

| Input | | 00 (Access to editing register) | | 01 (Access to upper byte memory) | | 10 (Access to lower byte memory) | | 11 (Access to both byte memories) | |
|---|---|---|---|---|---|---|---|---|---|
| | Access Memory Specifying Signal | | | | | | | | |
| | Read/Write Control Signal | 1 (Read) | 0 (Write) | 1 (Read) | 0 (Write) | 1 (Read) | 0 (Write) | 1 (Read) | 0 (Write) |
| Output | 370 | L | ↑(H) | L | L | L | L | ↑(H) | L |
| | 375 | X | H | X | X | X | X | L | X |
| | 380 | X | X | X | H | X | X | X | L |
| | 385 | L | H | L | H | L | H | L | H |
| | 390 | L | X | H | X | H | X | H | X |
| | 395 | X | X | L | X | H | X | H | X |

(H: high level, L: low level, ↑: trigger, X: intermediate level)

The data control unit 10 can selectively produce any of eight different memory accesses as shown in the Table 1. The access memory specifying signal 101 discriminates the access to both upper and lower byte memories (when the signal 101 is "11"), the access to the lower byte memory only (when the signal 101 is "10"), the access to the upper byte memory only (when the signal 101 is "01") and the access to the editing register 420 in the memory controller (when the signal 101 is "00"), from each other. Each of those four memory accesses has two states depending on the read/write control signal 110 which indicates the read state or the write state. Therefore, eight different memory accesses can be discriminated. The control signals 370-395 effect those accesses.

When the data control unit 10 reads the content of the editing register 420, the content thereof is read into the data bus 200 through the multiplexor 290 which is controlled by the signals 385 and 390. When the data control unit 10 writes the data into the editing register 420, the data in the data bus 200 passes through the multiplexor 275 by the switching signal 375 and it is written into the editing register 420 by the latch signal 370.

According to the present embodiment, when the data control unit 10 writes the data into the refresh memory unit 12 or reads the content of the unit 12, it can not only access the upper byte memory 1221 and the lower byte memory 1222 in the unit 12 separately but also can address both byte memories simultaneously. Accordingly, for the data editing which requires repetitive data processing such as erase, insertion or deletion of the display data, the execution time of the microprocessor in the data control unit for performing the above processing can be reduced. For example, when the display content is to be changed to read characters H one character at a time, the data control unit 10 first specifies the editing register 420 in the memory controller 124 and writes a read control code therein. Then an H character code is loaded in an accumulator of the microprocessor unit in the data control unit 10. The unit 10 simultaneously addresses the memories 1221 and 1222 in parallel to write data therein. As a result, the content of the accumulator is stored in the specified address of the memory 1222 and at the same time the content of the editing register 420 is stored in the specified address of the memory 1221. Where similarchange is further required, the address is changed and the access is made thereto. In this manner, the 2-byte information can be simultaneously written into the memory unit 122 by a single access. Therefore, when the contents of the upper byte memory 1221 and the lower byte memory 1222 are to be simultaneously changed, it is not necessary to separately address them to write data therein or to read data stored therein. Furthermore, when the access is to be changed from the access to the upper byte memory 1221 to the access to the lower byte memory 1222 (or vice versa), it is not necessary to store the next address to the current upper byte memory address in preparation for the next access to the upper byte memory. Accordingly, the data editing can be carried out in an efficient manner.

Figure 3:
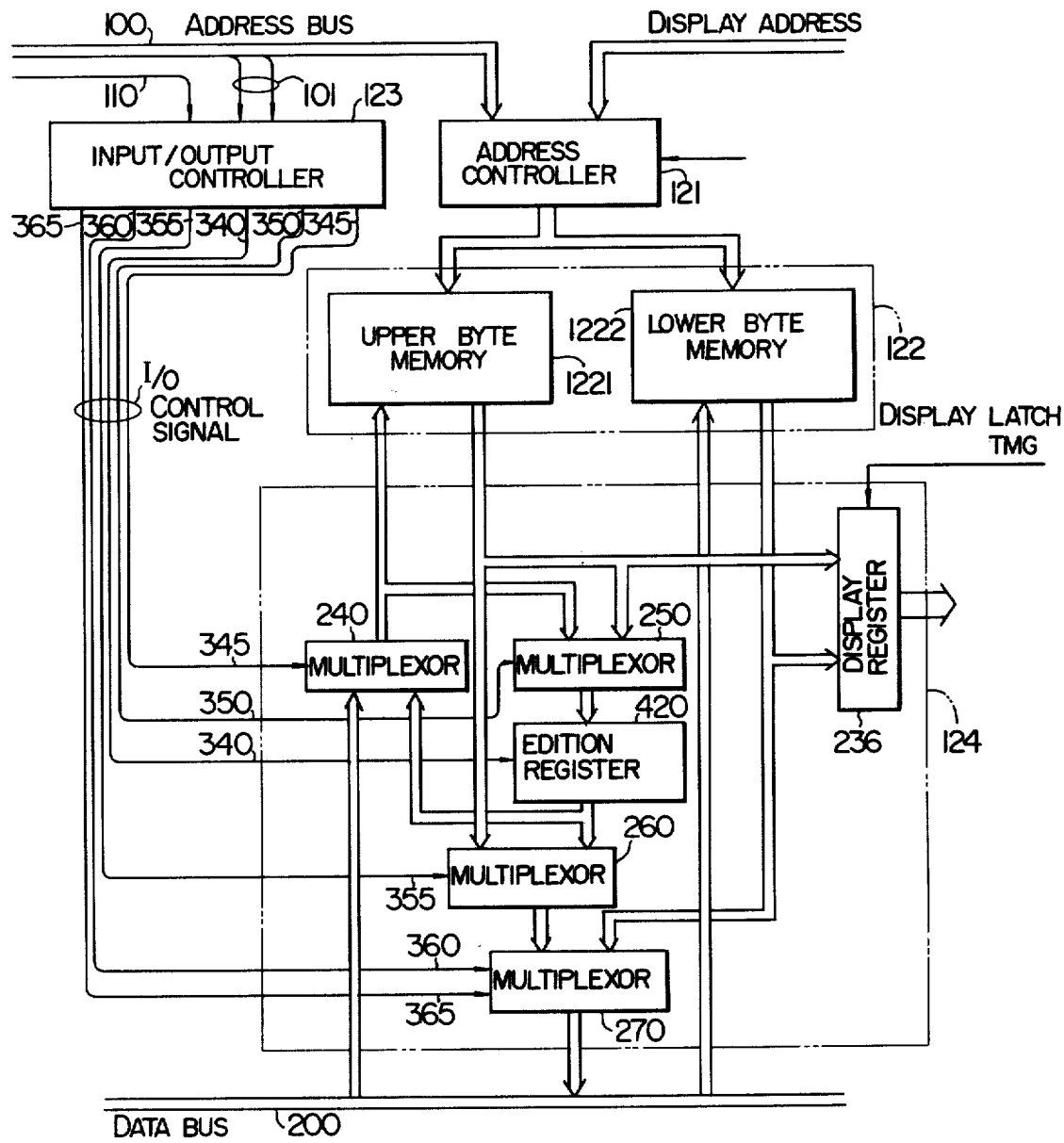
FIG. 3 shows another configuration of the refresh memory unit having a similar function to that shown in FIG. 2.

Another embodiment of the present invention is now explained. FIG. 3 shows a somewhat different configuration of the refresh memory unit shown in FIG. 2. In FIG. 3, the memory controller 124 comprises the display register 236 for reading the display data and storing it therein and the editing register 420 and the multiplexors (240, 250, 260 and 270) which are controlled by the I/O control signals, respectively. The other configuration is the same as that of FIG. 2. Since the configuration of the memory controller 124 is different from that in FIG. 2, the outputs of the I/O controller (I/O control signals 340, 345, 350, 355, 360 and 365) change as follows:

340 ... a latch signal for storing the data in the editing register 420.

345 ... a switching signal for passing one of two input signals to the multiplexor 240 (data on the data bus 200 and data in the editing register 420).

350 ... a switching signal for passing one of two input signals to the multiplexor 250 (data from the multiplexor 240 and data in the upper byte memory 1221).

355 ... a switching signal for passing one of two input signals to the multiplexor 260 (data in the editing register 420 and data in the upper byte register 1221).

360 ... an output control signal of the multiplexor 270.

365 ... a switching signal for supplying to the data bus 200 one of two input data to the multiplexor 270 (data from the multiplexor 260 and data in the lower byte memory 1222).

The I/O controller which produces the above signals may be constructed by a ROM, as in the case of FIG. 2, which produces the signals which meet the following truth table. The triggering of the latch signal 340 can be attained by latching a high level output of the ROM.

TABLE 2

| | Access Memory Specifying Signal | 00 (Access to editing register) | | 01 (Access to upper byte memory) | | 10 (Access to lower byte memory) | | 11 (Access to both byte memory) | |
|---|---|---|---|---|---|---|---|---|---|
| Input | Read/Write Control Signal | 1 (Read) | 0 (Write) | 1 (Read) | 0 (Write) | 1 (Read) | 0 (Write) | 1 (Read) | 0 (Write) |
| Output | 340 | L | ↑(H) | L | L | L | L | ↑(H) | L |
| | 345 | X | L | X | L | X | X | X | H |
| | 350 | X | L | X | X | X | X | H | X |
| | 355 | H | X | L | X | X | X | X | X |
| | 360 | L | H | L | H | L | H | L | H |
| | 365 | L | X | L | X | H | X | H | X |

(H: high level, L: low level, ↑: trigger, X: intermediate level)

It is seen from the above table that the controller 123 receives the access memory specifying signal 101 from the data control unit 10 and the 3-bit information of the read/write control signal 10 and produces eight different I/O control sighals (340, 345, 350, 355, 360 and 365) for performing the access.

In FIG. 3, when the data control unit 10 specifies an address in the lower byte memory 1222 to read the data stored therein, the data is read into the data bus 200 through the multiplexor 270 which is controlled by the signals 360 and 365. When the data control unit 10 writes the data into the lower byte memory 1222, the data on the data bus 200 is directly written into the lower byte memory 1222.

When the data control unit 10 accesses only the upper byte memory 1221, the data read passes through the multiplexor 260 which is controlled by the switching signal 355 and it is read into the data bus 200 through the multiplexor 270 which is controlled by the signals 360 and 365. When the data is written, the data on the data bus 200 is written into the upper byte memory 1221 through the multiplexor 240 which is controlled by the switching signal 345.

When the data control unit 10 simultaneously accesses both the upper and lower byte memories to read the data stored therein, the data to be read from the lower byte memory is read as if the lower byte memory alone were accessed while the data in the upper byte mwemory passes through the multiplexor 250 and it is read into the editing register 420 by the latch signal 340. When the data is to be written, the data on the data bus 200 is directly written into the lower byte memory 1222 while the data in the editing register 420 is written into the upper byte memory 1221 through the multiplexor 240 which is controlled by the switching signal 345.

When the data control unit 10 reads the data stored in the editing register 420, the data passes through the multiplexor 260 which is controlled by the switching signal 355 and it is read into the data bus 200 through the multiplexor 270 which is controlled by the signals 360 and 365. When the unit 10 writes the data into the editing register 420, the data on the data bus 200 passes through the multiplexors 240 and 250 and it is written into the editing register 420. Those operations are under control of the signals 345, 350 and 340.

Figure 4:
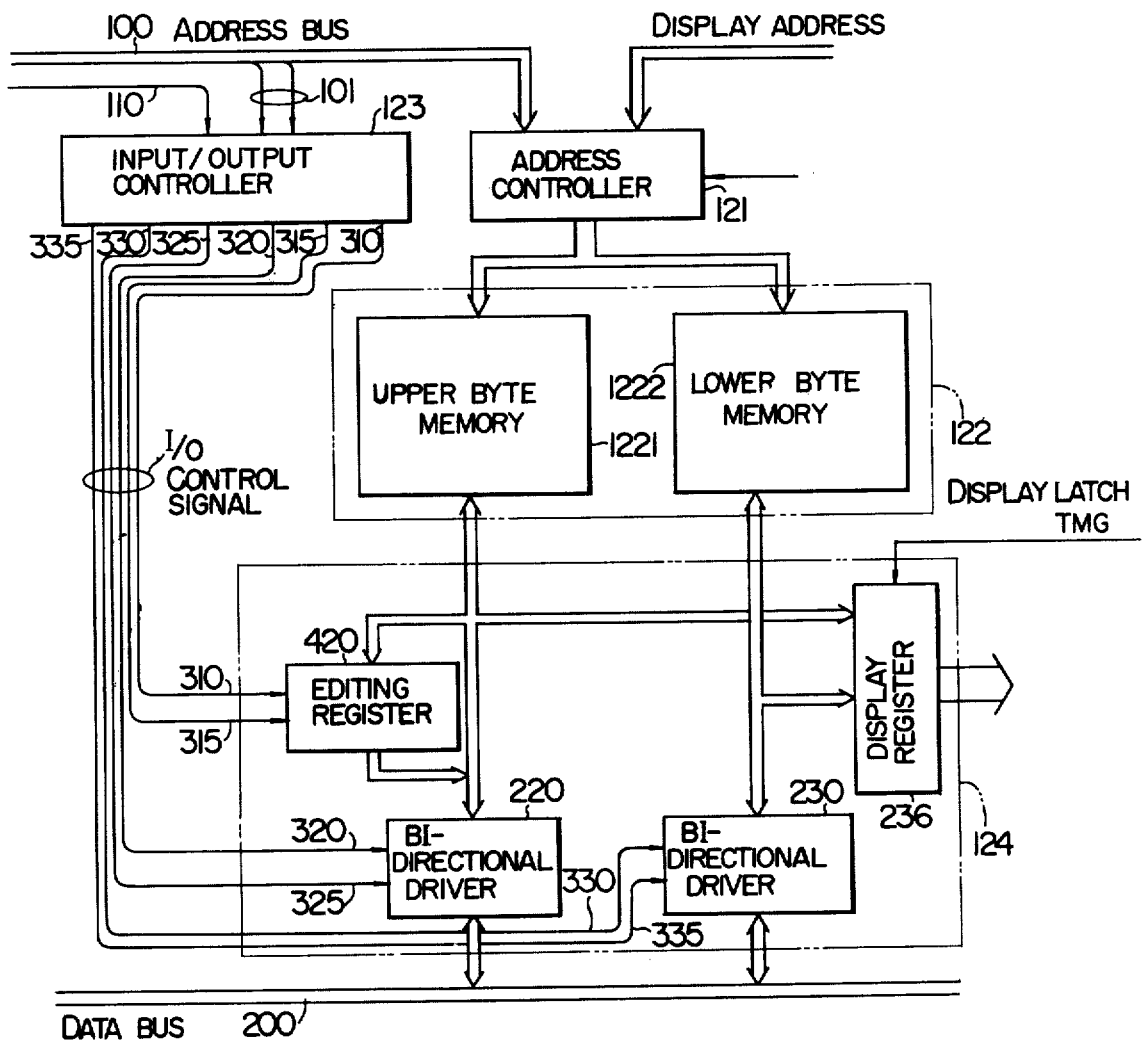
FIG. 4 shows another configuration of the refresh memory unit having a similar function to that shown in FIG. 2.

Another embodiment of the present invention is now explained. FIG. 4 shows a configuration of the refresh memory unit similar to those shown in FIGS. 2 and 3. An overall configuration of the display system is similar to that of FIG. 1. In FIG. 4, the memory controller 124 comprises the display register 236 which reads the display data and stores it therein, and the editing register 420 and two bi-directional bus drivers 220 and 230 which are controlled by the I/O control signals (310, 315, 320, 325, 330 and 335), respectively. The bi-directional bus driver may be Type 8216 manufactured and sold by Intel Corp. in U.S.A. The I/O controller 123 which supplies the I/O control signals to the memory controller 124 may be constructed by a ROM, as in the previous embodiments, which produces the following output signals in the illustrated embodiment.

TABLE 3

| Input | Access Memory Specifying Signal | 00 (Access to editing register) | | 01 (Access to upper byte memory) | | 10 (Access to lower byte memory) | | 11 (Access to both byte memory) | |
|---|---|---|---|---|---|---|---|---|---|
| | Read/Write Control Signal | 1 (Read) | 0 (Write) | 1 (Read) | 0 (Write) | 1 (Read) | 0 (Write) | 1 (Read) | 0 (Write) |
| Output | 310 | L | L | H | H | L | X | L | L |
| | 315 | L | ↑(H) | X | X | L | L | ↑(H) | L |
| | 320 | L | L | L | L | H | H | H | H |
| | 325 | L | H | L | H | X | X | X | X |
| | 330 | H | H | H | H | L | L | L | L |
| | 335 | X | X | X | X | L | H | L | H |

(H: high level, L: low level, ↑: trigger, X: intermediate level)

When the data control unit 10 separately accesses the upper byte memory 1221 and the lower byte memory 1222, the operation is as follows. When the data stored in the lower byte memory 1222 is to be read or when the data is to be written into the memory 1222, the data is transferred through the bi-directional driver 230, which is controlled by the drive signal 330 for actuating the driver and the direction control signal 335 for indicating the write direction or the read direction. When the upper byte memory 1221 alone is accessed, the data is transferred through the bi-directional driver 220, which is controlled by the drive signal 320 and the direction control signal 325.

When the data control unit 10 simultaneously accesses the upper byte memory 1221 and the lower byte memory 1222, the operation is as follows. For the read operation, the data in the lower byte memory 1222 is read into the data bus 200 through the bi-directional driver 230 which is controlled by the driver signal 330 and the direction control signal 335. The data in the upper byte memory 1221 is read into the editing register 420 which is controlled by the output control signal 310 and the latch signal 315. For the write operation, the data is written into the lower byte memory 1222 by writing the data on the data bus 200 into a specified address through the bi-directional driver 230. The data is written into the upper byte memory 1221 by writing the content of the editing register 420 into a specified address.

The access between the data control unit 10 and the editing register 420 is carried out through the bi-directional driver 220.

As described hereinabove, according to the present invention, the memory access by the data control unit 10 which includes the microprocessor can be made either by one byte at a time or by two bytes at a time. Accordingly, the editing of the content displayed on the screen can be carried out in a highly efficient manner.

We claim:

1. In a microprocessor controlled display system comprising a data control unit which incorporates therein a microprocessor and a microprogram memory for storing a program for operating said microprocessor and carries out data access with an external information source and data access with a refresh memory unit connected thereto via an address bus and a data bus, said refresh memory unit storing a field of data to be displayed through the data access with said data control unit and reading said data for display in synchronism with display timing, a video control unit for converting the data read for display from said refresh memory unit to a video signal, and a viewer for receiving said video signal to display an image thereof; the improvement that said refresh memory unit comprises;
   (a) a plurality of byte memories each storing the data by byte,
   (b) an address controller for switching display addresses and addresses from said data control unit in a time division manner to enable the access to addresses of said plurality of byte memories,
   (c) an I/O controller for receiving a read/write control signal indicating a particular type of access and an access memory specifying signal indicating a particular memory to be accessed, from said data control unit and producing I/O control signals in accordance with the received signals, and
   (d) a memory controller responsive to said I/O control signals to cause the data access between said data control unit and said plurality of byte memories to be carried out for each byte memory or for said plurality of byte memories.

2. A microprocessor controlled display system according to claim 1 wherein said access memory specifying signal comprises most significant two bit signals on said address bus.

3. A microprocessor controlled display system according to claim 1 wherein said memory controller includes an editing register for storing editing data, said editing register being provided for one of said plurality of byte memories, and multiplexors coupled at an input and an output of said editing register and being adapted to select a destination address of the data in response to said I/O conrol signals whereby when said plurality of byte memories are simultaneously accessed, data in the byte memory which is provided with said editing register is accessed by said editing register while data in the other byte memories are accessed by said data control unit through said data bus.

4. A microprocessor controlled display system according to claim 1 wherein said memory controller includes bi-directional drivers which are arranged between each of said plurality of byte memories and said data bus, respectively, and controlled by said I/O control signals, and an editing register arranged between one of said bi-directional drivers and one of said plurality of byte memories.

5. In a microprocessor controlled display system comprising a data control unit which incorporates therein a microprocessor and a microprogram memory for storing a program for operating said microprocessor and carries out data access with an external information source and data access with a refresh memory unit connected thereto via an address bus and a data bus, said refresh memory unit storing a field of data to be displayed through the data access with said data control unit and reading said data for display in synchronism with display timing, a video control unit for converting the data read for display from said refresh memory unit to a video signal, and a viewer for receiving said video signal to display an image thereof; the improvement that said refresh memory unit comprises;
(a) a plurality of byte memories each storing the data by byte,
(b) an address controller for switching display addresses and addresses from said data control unit in a time division manner to enable the access to addresses of said plurality of byte memories,
(c) an I/O controller for receiving a read/write control signal indicating a particular type of access and an access memory specifying signal indicating a particular memory to be accessed, from said data control unit and producing I/Q control signals in accordance with the received signals, and
(d) a memory controller including an editing register having at least one byte capacity for use in access between the data control unit and the plurality of byte memories, and receiving the I/O control signals from the I/O controller which specify data access to each byte memory or the plurality of byte memories, and controlling to perform data access between the corresponding byte memory and the data control unit through the data bus when the input/output control signals designate separate data access to each byte memory and controlling to perform data access both between the one byte memory and data control unit through the data bus and between the remaining byte memory and the editing register when the input/output control signals designate simultaneous data access to both byte memories.

6. A microprocessor controlled display system according to claim 1, 2, 3, 4, or 5 wherein said input/output controller is constituted by a read only memory.

7. A microprocessor controlled display system according to claim 1 or 5 wherein said refresh memory unit comprises;
(a) a plurality of byte memories each storing the data by byte,
(b) an address controller for switching display addresses from said data control unit in a time division manner to enable the access to address of said plurality of byte memories,
(c) an I/O controller receiving a read/write control signal indicating a particular type of access and an access memory specifying signal indicating a particular memory to be accessed, from said data control unit and producing I/O control signals in accordance with the received signals, and
(d) a memory controller including an editing register having a capacity of at least one byte and receiving one of the I/O control signals, and a multiplexer for passing either the output data from said editing register or the data carried on the data bus by means of another I/O control signal, the input of the one of said byte memories being coupled with the output of said multiplexer, the output of the other of said byte memories being coupled with the input of said editing register.

8. A microprocessor controlled display system according to claim 1 or 5 wherein said refresh memory unit comprises;
(a) a plurality of byte memories each storing the data by byte,
(b) an address controller for switching display addresses and addresses from said data control unit in a time division manner to enable the access to addresses of said plurality of byte memories,
(c) an I/O controller for receiving a read/write control signal indicating a particular type of access and an access memory specifying signal indicating a particular memory to be accessed, from said data control unit and producing I/O control signals in accordance with the received signals, and
(d) a memory controller including an editing register having a capacity of at least one byte for receiving the I/O control signals, and a multiplexer for passing either the output data from said editing register or the data carried on the data bus by means of another I/O control signal, said output of said multiplexer being coupled with said editing register, the input of one of said byte memories being coupled with the output of said multiplexer.

* * * * *